(12) United States Patent
Odlyzko

(10) Patent No.: US 6,295,294 B1
(45) Date of Patent: *Sep. 25, 2001

(54) TECHNIQUE FOR LIMITING NETWORK CONGESTION

(75) Inventor: Andrew M. Odlyzko, Berkeley Heights, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/908,689

(22) Filed: Aug. 7, 1997

(51) Int. Cl.⁷ .................................................. H04L 12/56

(52) U.S. Cl. ..................... 370/389; 370/234; 370/236; 709/238

(58) Field of Search .................................. 370/252, 232, 370/237, 220, 395, 355, 258, 234, 401, 238, 236, 349, 389; 379/114, 496, 22, 89; 343/204; 375/222; 709/238–244

(56) References Cited

U.S. PATENT DOCUMENTS

| | | | |
|---|---|---|---|
| 5,504,744 | * 4/1996 | Adams et al. | 370/232 |
| 5,631,908 | * 5/1997 | Saxe | 370/235 |
| 5,633,859 | * 5/1997 | Jain et al. | 370/234 |
| 5,726,984 | * 3/1998 | Kubler et al. | 370/349 |
| 5,732,078 | * 3/1998 | Arango | 370/355 |
| 5,745,837 | * 4/1998 | Fuhrmann | 455/5.1 |
| 5,828,737 | * 10/1998 | Sawyer | 379/114 |
| 5,854,985 | * 12/1998 | Sainton et al. | 455/553 |
| 5,987,061 | * 11/1999 | Chen | 375/222 |
| 5,999,563 | * 12/1999 | Polley et al. | 375/222 |
| 6,009,097 | * 12/1999 | Han | 370/395 |
| 6,064,653 | * 5/2000 | Farris | 370/237 |

OTHER PUBLICATIONS

Alok Gupta, Dale O. Stahl, Andrew B. Whinston, "Managing the Internet as an Economic System", National Science Foundation, Jul. 1994.*

Padmanabhan, Srinagesh, *Internet Cost Structures and Interconnection Agreements*, Presented at MIT Workshop on Internet Economics, Mar. 1995.

Frank P. Kelly, *Charging and Accounting for Bursty Connections*, Presented at MIT Workshop on Internet Economics, Mar. 1995.

Joseph P. Bailey, *Economics and Internet Interconnection Agreements*, Presented at MIT Workshop on Internet Econimics, Mar. 1995.

David D. Crawford, *Pricing Network Usage: A Market for Bandwidth or Market for Communication?*, Presented at MIT Workshop on Internet Econimics, Mar. 1995.

Scott Shenker et al., *Pricing in Computer Networks: Reshaping the Research Agenda*, Pergamon, Telecommunications Policy, vol. 20, No. 3, pp. 183–201, 1996.

(List continued on next page.)

Primary Examiner—Hassan Kizou
Assistant Examiner—John Pezzlo
(74) Attorney, Agent, or Firm—Kenyon & Kenyon

(57) ABSTRACT

A technique for regulation of packet switched network traffic through usage-sensitive pricing is disclosed. The network is partitioned into logical channels and a user incurs a cost for use of each of the logical channels. The logical channels differ primarily with respect to the cost to the user. Each user will select a channel that provides the subjectively optimal balance of cost and perceived quality of service, with the lowest cost channels presumably carrying the most traffic (and hence being more congested) and the highest cost channel accordingly carrying the least traffic (and hence being the least congested). Network traffic will accordingly be distributed between channels and each user will incur predictable charges without being precluded from seeking a higher quality of service when desired.

44 Claims, 2 Drawing Sheets

OTHER PUBLICATIONS

David C. Clark, *Adding Service Discrimination to the Internet*, Telecommunications Policy, vol. 20, No. 3, pp. 169–181, Pergamon, 1996.

Scott Shenker, *Service Models and Pricing Policies for an Integrated Services Internet*, Palo Alto Research Center, Xerox Corporation.

Andrew Odlyzko, *The Bumpy Road of Electronic Commerce*, WebNet 96—World Conf. Web Soc. Proc., pp. 378–389, AACE, 1996.

Scott Shenker, *Fundamental Design Issues for the Future Internet*, IEEE Journal on Selected Areas in Communications, vol. 13, No. 7, Sep., 1995.

Peter C. Fishburn et al., *Fixed Fee Versus Unit Pricing for Information Goods: Competition, Equilibria, and Price Wars*, First Monday, http://www.firstmonday.dk, vol. 2, No. 7, 1997.

David D. Clark, *A Model for Cost Allocation and Pricing in the Internet*, Presented at MIT Workshop on Internet Economics, Mar. 1995.

\* cited by examiner

TECHNIQUE FOR LIMITING NETWORK CONGESTION

FIELD OF THE INVENTION

The invention relates generally to regulation of network traffic. More particularly, the invention relates to limiting congestion in packet switched network traffic such as that carried over the Internet.

BACKGROUND OF THE INVENTION

The Internet is becoming increasingly popular as more and more participants endeavor to benefit from the promised benefits of the Information Highway. However, just as the promise of unrestricted travel over the interstate highway system has been thwarted by traffic jams in many urban areas, congestion over the Internet backbone threatens to prevent deployment of new services and limit the enjoyment of current ones.

The Internet interconnects over one hundred thousand different networks into a vast global network. Already huge, the Internet is growing at an exponential rate. In fact, the Internet is growing so fast that some notable computing pioneers, such as Bob Metcalfe, the inventor of Ethernet, have predicted its collapse. Although the Internet has not collapsed so far, it is heavily congested and providing levels of service that are universally perceived as inadequate.

The problem with decreasing performance on the Internet has been addressed, at least in part, by changes in the speeds at which users interface with the Internet. An increasing number of users rely on high speed digital connections or high speed modems that communicate over the telephone lines at speeds thought not possible a few years ago. Unfortunately, the cumulative effect of higher speed connections is more data on the Internet and the problem of congestion is moved to the backbone of the Internet. In fact, many users disparagingly refer to the World Wide Web as the "World Wide Wait" because of the delays caused by, at least in part, increasing congestion.

Some users have sought to resolve these issues by changing their Internet Service Providers (ISPs) in an attempt to find the ISP with the highest perceived quality of service. However, the current switching technologies used for the Internet do not provide a guaranteed quality of service. Moreover, few, if any, ISPs are willing to guarantee a particular level of quality of service. Furthermore, except for the differences between a direct digital connection (e.g., ISDN) and an analog (modem) connection, there is no apparent direct relationship between the cost for the connection and the quality of service. Pricing differentials in contemporary ISPs depend primarily on whether a user selects a fixed rate with unlimited access (i.e., a flat monthly charge) or a rate based only on connection time.

Although consumers generally prefer flat-rate pricing, congestion on the Internet will likely be significantly worsened by flat-rate pricing. Because Internet data transfers can take place without human attention, there is little incentive against remaining connected and transferring large amounts of data that might or might not be useful. In the case of usage-sensitive pricing, however, the cost for each packet (or byte of data) precludes thoughtless bandwidth consumption. Accordingly, usage-based pricing provides a mechanism by which traffic on the Internet may be regulated. It also provides economic incentives for Internet service providers to build adequate capacity, incentives that are, at best, weak with flat-rate prices.

There have been several proposals for various kinds of usage-based pricing for the Internet, many of which are discussed in *Internet Economics*, McKnight, L. W., and Bailey, J. P., eds., (MIT Press, 1997), incorporated by reference herein. For example, MacKie-Mason and Varian have proposed imposing charges on packets that contribute to congestion in the network in "Pricing the Internet" in *Public Access to the Internet*, D. Kahin and J. Keller, eds., MIT press, 1995, pp. 269–314 and in "Pricing Congestible Network Resources," IEEE J. Selected Areas Comm., 13 (1995), pp. 1141–1149. However, their proposal suffers from the disadvantage that it requires complex systems to conduct an auction among individual packets at the congested node. Moreover, their proposal does not address the absence of a direct correlation between delay or loss of packets at a single node and performance of the entire network. Furthermore, their proposal does not allow advance prediction of the cost for transmission of a single packet. It is generally believed that most consumers will not accept uncertainty in pricing.

Gupta, Stahl and Whinston have proposed prioritized service classes as a possible solution to congestion in the Internet in "Priority Pricing of Integrated Services Networks" in *Internet Economics* and elsewhere. However, their proposal introduces substantial overhead and undesirably results in low priority classes not getting any bandwidth when there is too much higher priority traffic.

In general, these proposals suffer from similar disadvantages in that they introduce an undesirable element of overhead complexity to the system and are overly dependent on per packet analysis. The primary disadvantages of focusing on per packet analysis is that most service degradation in the Internet is caused by unpredictable actions of others. Because packet switched network traffic is extremely bursty, it has proved difficult to accurately predict and optimize network traffic by predictive parameter adjustment.

A continuing roadblock to achieving an information superhighway on the Internet is the problem of traffic congestion and steadily deteriorating perceived quality of service as more and more users log on and ever increasing quantities of undifferentiated data are communicated across the Internet. As long as the contemporary network structure treats all data identically without an adequate mechanism for readily differentiating data transmissions on the basis of users' priority, the Internet will likely remain congested. Moreover, regulating network traffic to limit congestion should add minimal overhead and complexity to the network and it should be essentially predictable and widely applicable to a broad spectrum of communications.

SUMMARY OF THE INVENTION

In view of the foregoing, there is a need to regulate traffic over a packet switched network in a way that fairly prioritizes the traffic without unfairly penalizing low priority traffic or allowing excessive free riding. This invention provides a novel technique for regulating network traffic over packet switched networks such as the Internet. The present invention may be readily applied to any network data path, although it is presently contemplated that it may be most advantageously implemented in a backbone of a large data network such as the Internet.

In the present invention, the user is presented with the option of selecting a channel from a plurality of channels over which to send packets. These channels are only logically separate and part of the same physical network. The primary difference between the channels is the price charged to the user. Traffic management is provided largely by the users through their selection of a channel over which their packets are sent and received. The channels with higher prices would attract less traffic and would thereby provide a higher quality service.

The present invention is advantageously flexible in that either the sender or the receiver of information may be charged for transmission of a packet in a usage-sensitive priced packet switched network. Advantageously, charges may be incurred on the basis of packets sent or packets received.

Dividing the network into logical channels having graded costs will regulate traffic and limit congestion because users who perceive that the quality of service on a lower cost channel has degraded to an unacceptable level will, if they have the available resources, switch to a higher cost channel which, because of its higher cost, will have less traffic and hence less congestion. As each channel becomes unacceptably congested, the user will switch to progressively higher cost channels until the user achieves a subjectively acceptable balance of cost and perceived quality of service. Periods of congestion would lead to some users finding that they could not obtain an acceptable level of service at price they could afford. In that case, they would likely postpone or cancel the data transmission, lessening the congestion. In contrast, in the Internet today, users do not have any economic incentives to lower their usage and thereby generally reduce congestion (although the TCP protocol forces them to do so).

Accordingly, a user will select a logical channel for data communication in accordance with a subjectively perceived priority. For example, a user may select a low cost channel for regular electronic mail, unattended file transfers, etc., while selecting a higher cost channel for World Wide Web browsing or interactive network communications (e.g., chat). The user may select an even higher cost channel for urgent electronic mail or other high priority traffic.

A user with extensive resources, perceiving that network communications are proceeding too slowly, will select a higher cost channel which, because of its higher cost, is presumably less crowded and accordingly has more available bandwidth. In other words, a user perceiving that the quality of service received does not meet his requirements can incur greater costs (i.e., pay more) to obtain what he perceives to be a higher quality of service.

Another user with less resources may select the lowest cost channel for all communications whereas a user with relatively unlimited resources could, conversely, select the highest cost channel for all communications. Restricted only by the number of logical channels, each individual user can determine the optimal balance between cost and perceived quality of service for his network connections, essentially networking in accordance with the adage, "you get what you pay for."

There would not necessarily be any quality of service guarantees associated with the different channels, only different expectations. This is expected to be acceptable to users as the various channels would have stable utilization rates.

Advantageously, the present invention enbables network designers to provide differential quality of service without requiring complex software or hardware. In particular, the present invention does not require any coordination between routers far apart in the network, preserving the simplicity of the current Internet in which routing decisions are made based on local conditions and the packets being processed.

It is important to note that cost is not necessarily expressed in monetary terms and may be evaluated or incurred in some other form. However, the cost for data transmission should be a consideration for each user such that a user allocates communication based on subjectively perceived priorities. If this were not the case, users would be free to surf between channels and selecting a channel solely on the basis of perceived congestion, with the result that, once an equilibrium state was achieved, all channels would be equally congested and any benefits of partitioning could be lost.

Accordingly, the network is partitioned into logical channels, each of which is allocated a substantially equal portion of the available bandwidth in an embodiment of the present invention. Although a data path may be divided into any number of logical channels, it is expected that the additional complexity required for more than eight channels may outweigh any benefits likely to be obtained using current technology. In general, it is believed that dividing a data path into three to four logical channels achieves an optimal balance with respect to implementation complexity and user perceptions.

In this embodiment of the present invention, before communicating across the data network, the network user decides which logical channel the network user's data traffic will flow across. This decision may be made for, inter alia, each data item, each data packet, each user application, or each user session. However, it is likely that superior traffic regulation (i.e., less congestion) may be obtained by requiring channel selection to be performed for a set number of data packets at a time. Channel selection could also be mandated at a system level. For example, a university network could require that all student electronic mail be transmitted across the lowest cost channel irrespective of student choice.

In the present invention, each data packet transmitted by a network user is evaluated by a router or other switching device at the input to the partitioned data network path. The entire network or just a portion of the network, such as the backbone, may be partitioned into logical channels. In one embodiment of the present invention, a header field may be used to identify the selected logical channel. In another embodiment of the present invention where channel selection is associated solely with a particular sender or recipient, the destination address may be used to identify the selected channel, or, alternatively, the source address could be used to identify the selected channel.

In order to ascertain incurred costs, it is also necessary to monitor the traffic across the data path and maintain appropriate records regarding communicated data. The specific monitoring would of course depend on the specific form of cost accounting implemented. In one embodiment of the present invention, costs could be incurred on a per packet basis. In an alternative embodiment of the present invention, costs are incurred (and therefore measured) as discrete data elements are communicated, as in a per byte basis. In another alternative embodiment of the present invention, costs could be incurred by a combination of packets and discrete data elements, such as in a combination of a per-packet and per-byte bases. The data elements may be measured at the input or the output of the partitioned data path or, alternatively, at the edge of a data network including a mixture of partitioned and non-partitioned data paths. Advantageously, it is not necessary to perform detailed accounting in the core of the network, where switching and transmission speeds are of overriding importance. Moreover, statistical sampling is likely to provide an adequate level of detail for purposes of the present invention, allowing implementation without rigorous traffic monitoring and accounting.

Additional features and advantages of the present invention will be understood from the following description of various embodiments, which description should be taken in conjunction with the accompanying drawing.

DETAILED DESCRIPTION

A novel technique for network traffic management is described herein. This technique is equally applicable to an entire network or a single network data path such as the Internet backbone.

The present invention partitions network data paths into separate logical channels that behave similarly but have different user costs associated with them. A user communicating on the network selects one of the partitioned logical channels for data communications based on the cost. Each user will therefore regulate his own network traffic based upon that user's available resources and/or his subjectively perceived priorities for various types of network traffic. Assuming a reasonable distribution of resources and rational users, a large fraction of network traffic will be transmitted and received across the lowest cost channel(s), thereby reserving bandwidth in higher cost channels for traffic having relatively greater importance to the users.

Thus, for example, a user may perceive that the quality of service on a particular channel is too low for real time video transmissions but adequate for news downloads. The user may then specify that channel for news downloads and select a higher cost channel for real time video. Similarly, a user could decide that the perceived quality of service on the lowest cost channel is too low for telnet but is perfectly acceptable for receiving bulk file transfers.

Accordingly, depending upon the embodiment of the present invention, the user could specify a higher cost channel for FTP (File Transfer Protocol) data communications while also selecting the lowest cost channel for electronic mail communications. Since each user will balance cost against desired quality of service, those communications requiring the highest quality of service (presumably obtained by having the greatest available bandwidth) will be transmitted across the highest cost logical channels while communications that can tolerate low quality of service (presumably caused by a congested channel with little available unused bandwidth) will be transmitted across the lowest cost logical channels.

Figure 1:
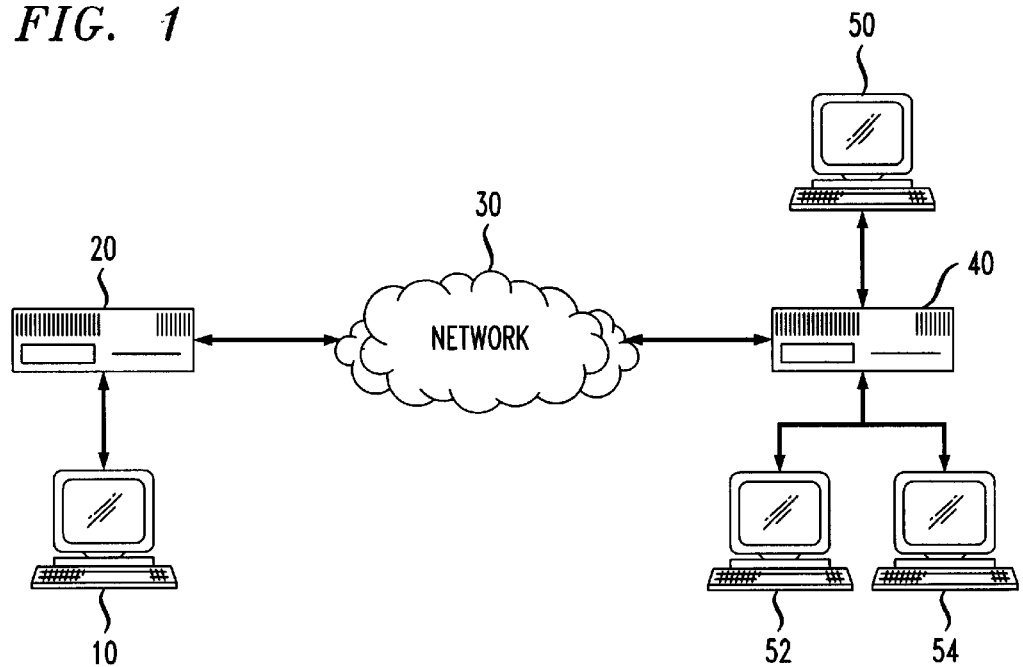
FIG. 1 is a schematic diagram illustrating communications across a network.

Referring to FIG. 1, a typical network is illustrated. Network user 10 communicates through router 20 which in turn communicates across the network backbone 30 with router 40. Router 40 provides network interconnections for network users 50, 52 and 54. Network users 10, 50, 52, and 54 may be network servers, user terminals, or any device receiving and/or transmitting data across the network. In the contemporary Internet, data packets are transmitted across the Internet backbone 30 through public Internet exchanges.

In theory, each transmitted data packet receives the same "best effort" to transmit the packet across the backbone. As long as capacity exceeds demand, the present system is completely adequate. However, as demand approaches capacity, the network becomes congested and users perceive a drop in the quality of service as packet loss and latency increase, a situation which is frequently aggravated by the bursty nature of network traffic.

Figure 2A:
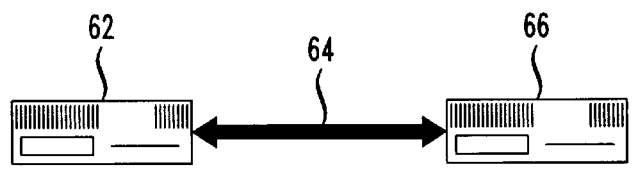
FIG. 2a is a diagram illustrating the physical connection between two routers in a network.

Referring to FIG. 2a, the connection between any two routers 62 and 66 may be thought of as a single data path 64. Routers 62 and 66 may be switches at the edge of the network or, in an alternative embodiment, routers 62 and 66 could be any two switches in the Internet that have established a connection. Data packets are received by router 62 and transmitted to router 66 across 64 in accordance with the specific router's operating algorithms. Thus, for example, packets could be transmitted in the same order they are received as in a FIFO queue.

Figure 2B:
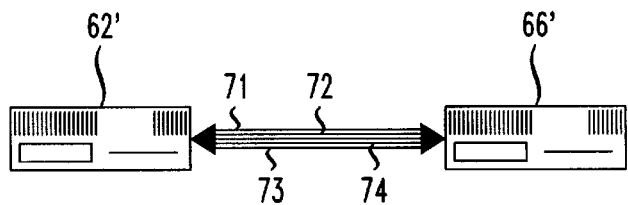
FIG. 2b is a diagram illustrating the logical channels between two routers in a network.

Referring to FIG. 2b, the routers 62' and 66' have been modified in accordance with the present invention and the connection between the routers has been partitioned into four logical channels: 71, 72, 73 and 74. In alternative embodiments, the path may be divided into two, three, eight or any number of logical channels.

Each logical channel can have a fixed portion of the network and the partitioning merely represents a division of the connection without any other modification. Various techniques for partitioning logically separate channels are known in the art as described in S. Keshav, *An Engineering Approach to Computer Networking: ATM Networks, the Internet, and the Telephone Network,* Addison-Wesley, 1997, incorporated by reference herein. For example, the router software can be modified to maintain separate queues for different channels. Alternatively, differential prioritizing of incoming packets could be utilized to give preferential treatment to packets from higher price channels. This could be accomplished, for example, by weighted round robin processing.

A data packet is received by router 62' and transmitted across one of logical channels 71, 72, 73 or 74 in accordance with the channel selection. In an embodiment of the present invention, the channel selection may be indicated in the packet header as discussed below.

Figure 3:
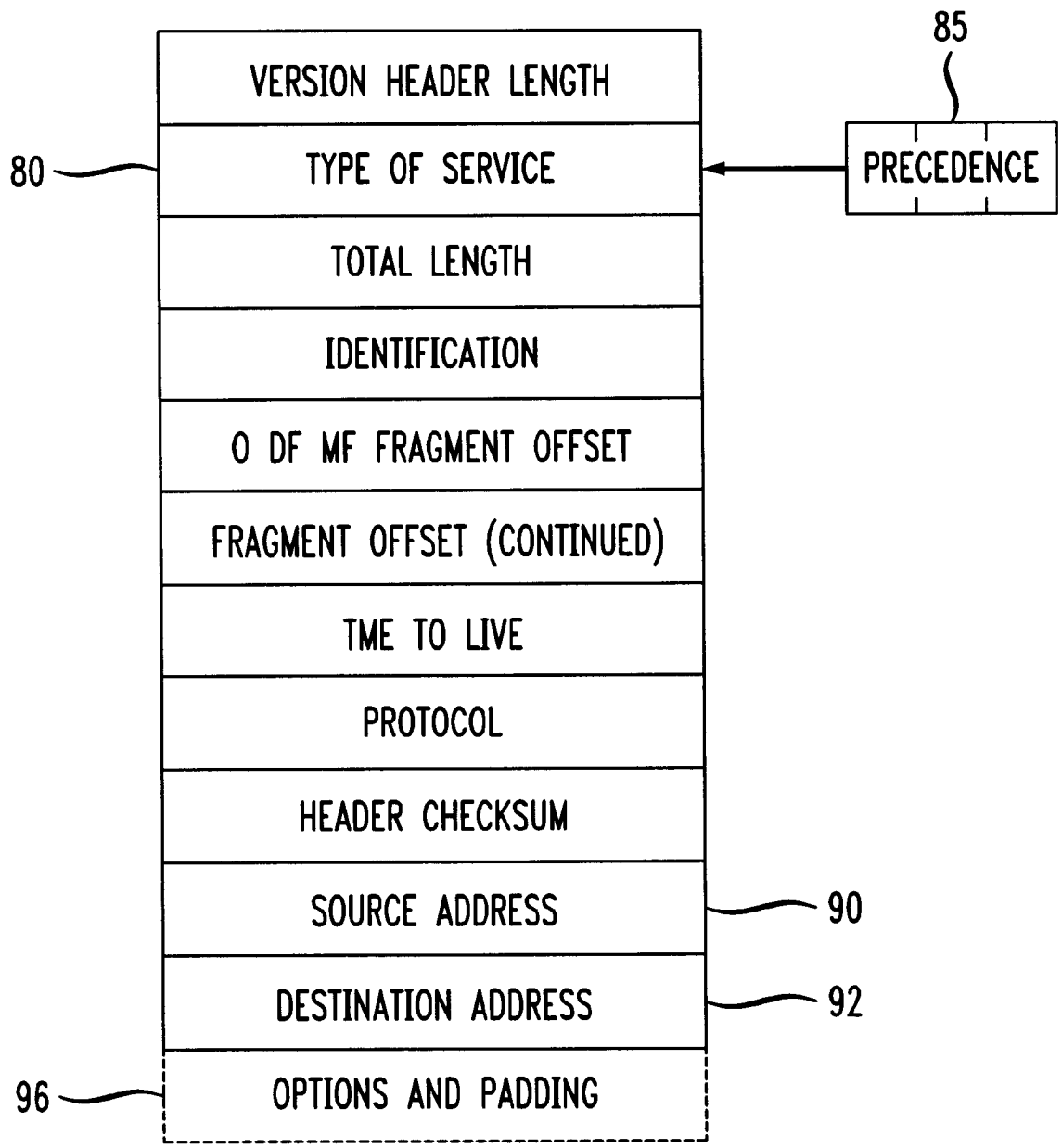
FIG. 3 is a diagrammatic representation of an Internet Protocol data packet header.

Referring to FIG. 3, an Internet Protocol Version 4 (IPV4) header format is illustrated. As shown, the IPV4 header includes a Type of Service 80 which is used to make type of service requests to IP routers. As shown, the Type of Service field includes a three bit Precedence field 85. The Precedence field is commonly unused and is therefore available for logical channel selection in the present invention. An IP router could evaluate the field in the same manner as other IP header fields are evaluated in order to determine which logical channel packet should be routed across. Thus, for example, the three bits of the Precedence field could be used to designate one of eight logical channels ($000_2$ through $111_2$) or, alternatively, each of the three bits could be a mutually exclusive flag designating one of three logical channels (i.e., $001_2$ or $010_2$ or $100_2$). In another alternative embodiment, the channel selection could be designated by a channel selection option field in the options and padding region 96 of the IP header. The value of the Precedence field is advantageously set before the packet is transmitted, thereby providing predictable pricing and preventing ad-hoc arbitrage (i.e., selecting the channel at the router based on congestion metrics).

In an embodiment of the present invention, channel selection is made by the user when the user establishes a connection with an Internet Service Provider. The user is presented with a range of usage rates associated with the logical channels and the user's network communications are communicated across the selected channel. In this embodiment, the channel selection could be made on the basis of the user's address, using the source address field 90 for transmitted packets and the destination address field 92 for received packets.

In an alternative embodiment of the present invention, the user is not restricted to a single logical channel for all communications. Instead, each application communicating over the network is capable of specifying a logical channel. In this embodiment, the operating system or the network connection would have to select a default logical channel for applications that are not capable of selecting a logical channel or which the user has not configured for logical channel selection. Advantageously, by allowing a user to specify different channels for different types of communications, this embodiment of the present invention provides users with a mechanism for obtaining a high quality of service when needed, such as for a real time video transmission, without wasting resources and unnecessarily congesting high cost channels with low priority traffic simply to preserve the ability to communicate with a high quality of service for the relatively few times it is needed.

In another alternative embodiment, channel selection could be performed for each individual packet as it was transmitted. However, it would be inefficient to select channels for each packet individually. First, it would add considerable processing overhead to the transmission of each packet. Second, allowing channel selection for each packet would allow a user to micro manage packet transmissions to minimize costs. Such micro management could significantly reduce the traffic management benefits obtained by the present invention by effectively replicating congestion in successively higher cost channels as users responded to burst-initiated congestion by switching en masse to the next higher cost channel and thereby congesting that channel. This undesirable effect could be readily minimized by applying channel selection to a fixed block of packets such that any arbitrage attempts would be diffused as different users would complete transmission of fixed blocks of packets at different times.

In a variation of this embodiment, a user could select a channel each time the user logged on to the network. Users who are able to select channels on a per session basis could tailor their channel selections in accordance with their own priorities (e.g., surfing for pleasure v. real-time stock trading) and/or the time of day (e.g., network response time varies depending on the time of day, such that a lower cost channel at midnight and a higher cost channel at noon provide the same perceived quality of service).

In another alternative embodiment of the present invention, users could be prevented from free-riding on the lowest cost channel by intentionally reducing the communication characteristics of the channel during periods of low demand. Intentional reduction of communication characteristics could be accomplished by, for example, variable buffer lengths.

Although various embodiments are specifically illustrated and described herein, it will be appreciated that modifications and variations of the present invention are covered by the above teachings and within the purview of the appended claims without departing from the spirit and intended scope of the invention. For example, the channel selection information could be recorded in the Transmission Control Protocol (TCP) header or the invention could be applied to a circuit-switched network or the sender and receiver of information could divide the charge, either on a predetermined or an ad hoc basis.

What is claimed is:

1. A method of regulating usage of an Internet Protocol packet switched data network, comprising:

establishing a predetermined number of logical channels between two points of the network having substantially equal bandwidth;

associating a different per byte usage cost with each of said logical channels;

presenting the option of selecting a logical channel from the predetermined number of logical channels to a plurality of network users;

receiving packet data and an identifier of a logical channel from one of the plurality of network users;

routing each packet across the respective identified logical channels;

estimating a number of bytes routed over the identified logical channel on behalf of a network user according to statistical sampling techniques; and applying a charge to each network user in accordance with said per byte usage cost associated with said identified logical channel and an estimated number of bytes routed over the identified logical channel.

2. The method of regulating usage of an Internet Protocol packet switched data network of claim 1 further comprising the steps of:

designating each of said logical channels by a unique channel designation;

assigning a channel selection value to a header field of each of said packets before said packet is communicated across said data network, said assigned channel selection value corresponding to a unique channel designation; and transmitting said packet across said logical channel designated by said unique channel designation corresponding to said assigned channel selection value.

3. The method of regulating usage of an Internet Protocol packet switched data network of claim 2 wherein said header field is a precedence field.

4. The method of regulating usage of an Internet Protocol packet switched data network of claim 3 wherein said data network is partitioned into a multiple of two logical channels having substantially equal bandwidth.

5. The method of regulating usage of an Internet Protocol packet switched data network of claim 3 wherein said data network is partitioned into three logical channels having substantially equal bandwidth.

6. The method of regulating usage of an Internet Protocol packet switched data network of claim 2 wherein a channel selection value is assigned to at least a predetermined number of said packets before said packets are communicated across said data network.

7. The method of regulating usage of an Internet Protocol packet switched data network of claim 1 further comprising the steps of:

identifying a source address and a destination address for each of said packets before said packet is communicated across said data network;

associating a logical channel with said source address or said destination address before said packet is communicated across said data network; and transmitting said packet across said logical channel associated with said source address or said destination address.

8. The method of claim 1, wherein said plurality of logical channels have different unit usage costs.

9. The method of claim 1, wherein the predetermined number of logical channels is two.

10. The method of claim 1, wherein the predetermined number of logical channels is three.

11. The method of claim 1, wherein the predetermined number of logical channels is four.

12. The method of claim 1, wherein the predetermined number of logical channels is eight.

13. A method of regulating use of an Internet Protocol packet switched data network, comprising:

establishing a predetermined number of logical channels between two points of the network having different processing priorities;

associating a different per byte usage cost with each of said logical channels;

designating each of said logical channels by a unique channel designation;

presenting the option of selecting a logical channel from the predetermined number of logical channels to a plurality of network users;

receiving packet data from one of the plurality of network users, a header field for each packet including a channel selection value identifying a unique channel designation;

identifying at least one of said logical channels as a constant bit rate channel;

limiting a number of said packets to which a channel selection value corresponding to the unique channel designation for said constant bit rate channel may be assigned;

transmitting each said packet in accordance with said processing priority;

estimating a number of bytes received over the identified logical channel on behalf of a network user according to statistical sampling techniques; and applying a charge to each network user for the number of bytes received from the network user in accordance with said per byte usage cost associated with said logical channel.

14. The method of regulating use of an Internet Protocol packet switched data network of claim 13 wherein said step of transmitting each said packet in accordance with said processing priority comprises weighted round-robin queueing and processing in order of relative packet priority.

15. The method of claim 13, wherein said plurality of logical channels have substantially equal bandwidth.

16. The method of claim 13, wherein the predetermined number of logical channels is two.

17. The method of claim 13, wherein the predetermined number of logical channels is three.

18. The method of claim 13, wherein the predetermined number of logical channels is four.

19. The method of claim 13, wherein the predetermined number of logical channels is eight.

20. A regulated packet switched communications network path, between two points of the network, for use with data packets having header information including channel selection information, comprising:

a predetermined number of channels having substantially equal bandwidth and a different per byte usage cost associated with each of said channels;

a channel selector monitoring cost-based channel selection information and allocating each incoming data packet from a network user to a channel in accordance with said cost-based channel selection information; and a usage monitor associated with each of said channels estimating a number of bytes communicated across each said channel on behalf of a network user according to statistical sampling techniques and applying a charge to each network user based on the estimated number of bytes and the per byte usage cost.

21. The regulated packet switched communications network path of claim 20 wherein said usage cost is incurred by the recipient of each said data packet.

22. The regulated packet switched communications network path of claim 20 wherein said usage cost is incurred by the sender of each said data packet.

23. The method of claim 20, wherein the predetermined number of logical channels is two.

24. The method of claim 20, wherein the predetermined number of logical channels is three.

25. The method of claim 20, wherein the predetermined number of logical channels is four.

26. The method of claim 20, wherein the predetermined number of logical channels is eight.

27. A method of limiting congestion in an Internet Protocol packet switched data network path between two points of the network, comprising:

partitioning the data network path into a predetermined number of logical channels having substantially equal bandwidth;

associating a different per byte usage cost with each of said logical channels;

designating each of said logical channels by a unique channel designation;

presenting the option of selecting a logical channel from the predetermined number of logical channels to a plurality of network users;

receiving packet data from the plurality of network users, a header field for each packet including a channel selection value identifying a unique channel designation;

identifying at least one of said logical channels as a constant bit rate channel;

limiting a number of said packets to which a channel selection value corresponding to the unique channel designation for said constant bit rate channel may be assigned;

transmitting each said packet across said logical channel designated by said unique channel designation corresponding to said assigned channel selection value;

estimating a number of bytes switched across each of said channels on behalf of a network user according to statistical sampling techniques; and applying a charge to each network user for the number of bytes received from the network user and communicated across each logical channel in accordance with the per byte usage cost associated with each said logical channel.

28. The method of limiting congestion in an Internet Protocol packet switched data network path of claim 27 wherein a channel selection value is assigned to at least a predetermined number of said packets before said packets are communicated across said data network path.

29. The method of limiting congestion in an Internet Protocol packet switched data network path of claim 27 wherein the bandwidth of the channel having the lowest associated usage cost is reduced when less than a predetermined number of packets have selected said channel having the lowest associated usage cost.

30. The method of limiting congestion in an Internet Protocol packet switched data network path of claim 27 wherein the usage cost of the channel having the lowest associated usage cost is zero.

31. The method of claim 27, wherein the predetermined number of logical channels is two.

32. The method of claim 27, wherein the predetermined number of logical channels is three.

33. The method of claim 27, wherein the predetermined number of logical channels is four.

34. The method of claim 27, wherein the predetermined number of logical channels is eight.

35. A network utilization method, comprising:

establishing a predetermined number of logical channels between two points of a data network, each logical channel having substantially equal bandwidth and an associated per packet usage cost that is different than the per packet usage costs of the other logical channels;

presenting the option of selecting a logical channel from the predetermined number of logical channels to a plurality of network users;

receiving a plurality of data sets from said plurality of network users, wherein each data set identifies one of the logical channels;

routing each data set over the identified logical channel;

estimating a number of packets routed over each logical channel on behalf of each network user according to statistical sampling techniques; and applying a charge to each network user for the number of packets routed over each logical channel in accordance with said per packet usage cost associated with each logical channel.

36. The method of regulating data network utilization of claim 35 wherein said logical channels have substantially equal bandwith.

37. The method of regulating data network utilization of claim 35 wherein said data network is packet switched, said usage cost is incurred when a packet is transmitted across one of said logical channels and said step of measuring each use of each of said logical channels comprises counting packets communicated across each of said logical channels.

38. The method of regulating data network utilization of claim 36 wherein said step of applying a charge for each said use in accordance with said measurement and said usage cost associated with said logical channel comprises applying a charge for each packet communicated across each of said logical channels.

39. The method of regulating data network utilization of claim 38 wherein said step of applying a charge for each said use in accordance with said measurement and said usage cost associated with said logical channel comprises applying a charge for each packet received across each of said logical channels.

40. The method of regulating data network utilization of claim 38 wherein said step of applying a charge for each said use in accordance with said measurement and said usage cost associated with said logical channel comprises applying a charge for each packet transmitted across each of said logical channels.

41. The method of claim 35, wherein the predetermined number of logical channels is two.

42. The method of claim 35, wherein the predetermined number of logical channels is three.

43. The method of claim 35, wherein the predetermined number of logical channels is four.

44. The method of claim 35, wherein the predetermined number of logical channels is eight.

* * * * *